(12) United States Patent
Tiwari et al.

(10) Patent No.: US 8,111,929 B2
(45) Date of Patent: Feb. 7, 2012

(54) METHOD AND SYSTEM TO DETECT AND QUANTIFY BLOCKINESS IN VIDEO FILES

(75) Inventors: Praveen Kumar Tiwari, Uttar Pradesh (IN); Abhishek Kumar Tiwary, Uttar Pradesh (IN); Anuj Verma, New Delhi (IN); Manik Gupta, New Delhi (IN); Prabhanjana Kumar Nallani, Andhra Pradesh (IN)

(73) Assignee: Interra Systems Inc., San Jose, CA (US)

( * ) Notice: Subject to any disclaimer, the term of this patent is extended or adjusted under 35 U.S.C. 154(b) by 1014 days.

(21) Appl. No.: 12/072,977

(22) Filed: Feb. 29, 2008

(65) Prior Publication Data

US 2009/0220152 A1    Sep. 3, 2009

(51) Int. Cl.
*G06K 9/36*    (2006.01)
(52) U.S. Cl. ...................................................... 382/232
(58) Field of Classification Search .................. 382/232, 382/236, 238, 239, 240, 248, 252; 348/420.1, 348/421.1, 425.2, 430.1; 375/240.24, 240.27
See application file for complete search history.

(56) References Cited

U.S. PATENT DOCUMENTS

| | | | | | |
|---|---|---|---|---|---|
| 5,500,689 | A | * | 3/1996 | Lam | 348/699 |
| 5,561,477 | A | * | 10/1996 | Polit | 348/700 |
| 7,099,518 | B2 | * | 8/2006 | Li et al. | 382/255 |
| 7,548,659 | B2 | * | 6/2009 | Ofek et al. | 382/254 |

OTHER PUBLICATIONS

"Image Blockiness Evaluation Based on Sobel Operator" by C. Perra, F. Massidda and D.D. Giusto International Conference on Image Processing, 2005, pp. 389-392, (Sep. 11-14, 2005).

* cited by examiner

*Primary Examiner* — Jose Couso

(57) ABSTRACT

A method and system for detecting and quantifying blockiness in a video file is disclosed. The video file is a file that has been decompressed by using standard DCT algorithms. The method includes segmenting each frame of the video file into multiple blocks. The method also involves comparing the intensity gradients of each block with one or more threshold values. The one or more threshold values represent predefined intensity variation characteristics. Further, the method includes determining the intensity variation parameters of each block, based on the comparison. Thereafter, a blockiness index is calculated for each block, after which a blockiness value is calculated for each frame. Finally, a blockiness level is assigned to each frame, based on its blockiness value. The blockiness level is a comparative measure of the blockiness of a frame that represents the blockiness content in the frame.

20 Claims, 8 Drawing Sheets

| Range | Blockiness Level |
|---|---|
| 0.00 – 4.99 | 0 |
| 5.00 – 14.99 | 1 |
| 15.00 – 24.99 | 2 |
| 25.00 – 34.99 | 3 |
| 35.00 – 44.99 | 4 |
| 45.00 – 54.99 | 5 |
| 55.00 – 64.99 | 6 |
| 65.00 – 74.99 | 7 |
| 75.00 – 84.99 | 8 |
| 85.00 – 94.99 | 9 |
| 95.00 – 94.99 | 10 |

Table 2

| Blockiness Value | No. of blocks |
|---|---|
| 0.00 | count 0 |
| 0.01 – 0.19 | count 1 |
| 0.20 – 0.39 | count 2 |
| 0.40 – 0.54 | count 3 |
| 0.55 – 0.69 | count 4 |
| 0.70 – 0.84 | count 5 |
| 0.85 – 0.99 | count 6 |
| 1.00 | count 7 |

Table 1

FIG. 8

METHOD AND SYSTEM TO DETECT AND QUANTIFY BLOCKINESS IN VIDEO FILES

FIELD OF THE INVENTION

The present invention relates generally to verification of media content. More specifically, it relates to a method and system to detect and quantify blockiness in video files.

BACKGROUND OF THE INVENTION

Media content is used in a variety of real-world applications today. Examples of media content can be audio and video files. There are certain features associated with the production and broadcasting of media content. Due to the use of new technologies, evolving industry standards and the use of open architecture in the development of media content, verification of features associated with the production and broadcasting of media content is essential for ensuring quality broadcasting of media content. As a result, media content developers, providers, broadcasters and operators need to carry out quality checks to verify media content.

Compression techniques are widely used to capture and transmit media content, especially digital video. Block-based transform coding is one of the compression techniques used in which each image frame of a digital video file is decomposed into rectangular regions called blocks and are transform coded. These image frames are then transmitted to a receiver. At the receiver, the coded frames are decoded and the blocks are re-assembled to reconstruct the image. A commonly used transform-coding technique is the Discrete Cosine Transform (DCT). One of the disadvantages of coding by using a block-based DCT transform is that the image is degraded during the coding process at high compression ratios. This is because the quantization noise is generally correlated within each block but not with other blocks. Consequently, the decoded image at the receiver shows discontinuities (image intensity variation) near the adjacent block boundaries. This feature is known as blockiness and is the most common distortion effect in block-based compression techniques, e.g., JPEG, MPEGx and H.26x. Detection of blockiness is one of the most important quality checks related to digital capture and transmission of the images of video files.

A method for detecting and measuring blockiness is described in the non-patent reference: "Image Blockiness Evaluation Based on Sobel Operator" by C. Perra, F. Massidda and D. D. Giusto. This paper appears in ICIP 2005, International Conference on Image Processing, 2005: Genoa, Italy; Publication date: 11-14 Sep. 2005. The following paragraph describes the method followed in this reference to detect and measure blockiness.

A convolution process is performed between the luma part of an image and the two Sobel masks $M_x$ and $M_y$, which are defined as follows:

$$M_x[3][3]=\{\{-1,0,1\},\{-2,0,2\},\{-1,0,1\}\};$$

$$M_y[3][3]=\{\{-1,-2,-1\},\{0,0,0\},\{1,2,1\}\}.$$

The luma part of the image is the achromatic part of the image that is used for determining blockiness in the image. The convolution process is a mathematical operation used by a discrete differentiation operator to calculate 2-dimensional approximations of gradients of image intensity at each pixel point of a digital image. The discrete differentiation operator is known as the Sobel operator. In mathematical terms, the gradient of image intensity at each pixel point is a vector pointing in the direction of largest possible intensity increase and having a length specifying the rate of change of intensity in that direction. Gradient approximation at each pixel point is specified by two values: an approximate value of the derivative of image intensity in the horizontal direction and an approximate value of the derivative of image intensity in the vertical direction. The Sobel operator operates the two Sobel masks $M_x[3][3]$ and $M_y[3][3]$ on each pixel point to calculate gradient values corresponding to the pixel point in the horizontal and vertical direction respectively. $M_x$ and $M_y$ are 3×3 discrete filters which are convolved with a two-dimensional array containing a pixel point value and 8 pixel point values around it for calculating the gradient values corresponding to that pixel point.

The gradient values for a pixel point (i,j) of an image I are calculated as follows:

Gradient value of image intensity in the horizontal direction $D_x(i,j)=I(i,j)*M_x(i,j)$ Gradient value of image intensity in the vertical direction $D_y(i,j)=I(i,j)*M_y(i,j)$ where * is the convolution operator. Finally, gradient values for the entire image I in the horizontal and vertical direction are obtained as multi-dimensional arrays $D_x$ and $D_y$, respectively. $D_x$ and $D_y$ are then divided into N×N blocks (N=8) to determine blockiness caused by an 8×8 DCT transform. A blockiness detection algorithm is then applied to each block to calculate a blockiness index for the block. The blockiness index is a combination of two measures. The first measure quantifies the intensity variation of pixels at the block boundary. The second quantifies the intensity variation of pixels inside the block.

The intensity variation measures are calculated as follows:

$$s_1 = \frac{1}{N}\left\{\sum_{(i,j)\in\Omega_{1V}}\frac{|D_x(i,j)|}{\max(D_x)} + \sum_{(i,j)\in\Omega_{1H}}\frac{|D_y(i,j)|}{\max(D_y)}\right\}$$

$$s_2 = \frac{1}{N_2}\sum_{(i,j)\in\Omega_2}\frac{D(i,j)}{\max(D)}$$

where $s_1$ signifies the intensity variation at the block boundary, $s_2$ signifies the intensity variation inside the block, $\Omega_{1V}$ denotes the pixels along the vertical boundaries of the block, $\Omega_{1H}$ the pixels along the horizontal boundaries of the block and $\Omega_2$ the inner pixels of the block, $D(i,j)=\sqrt{D_x(i,j)^2+D_y(i,j)^2}$ is the gradient magnitude at the pixel point (i,j), and N, $N_2$ are two normalization factors. (N, $N_2$ are the number of elements in the sums $s_1$ and $s_2$).

Once $s_1$ and $s_2$ are calculated, S, which is the blockiness index for the block, is calculated by using the following formula:

$$S = \left|\frac{s_1^\lambda - s_2^\lambda}{s_1^\lambda + s_2^\lambda}\right|$$

Thus blockiness index for each block is calculated and a final blockiness value for the image is calculated using the blockiness indexes of all the blocks.

However, the formula given above does not provide accurate measures of $s_1$ and $s_2$. In some conditions, for example, when the intensity variations of pixels inside and outside the block are low, the value of the blockiness index calculated by the formula given above is incorrect or indeterminate. Additionally, if there is true intensity variation at the block boundary or inside the block, the formula gives inaccurate results.

Based on the above, there is need for a method to accurately detect and quantify blockiness in a video file.

SUMMARY OF THE INVENTION

The present invention discloses a method for detecting and quantifying blockiness in a video file. The method includes segmenting image frame of the video file into one or more blocks. The method also includes comparing one or more parameters associated with the one or more blocks with one or more threshold values, where the threshold values signify the intensity variation characteristics of the one or more blocks. Based on the comparison, one or more intensity gradients are determined for the one or more blocks. Further, a blockiness index is computed for the one or more block, based on the one or more intensity gradients. Finally, the method includes determining a level of blockiness for the one or more image frames of the video file.

The present invention also discloses a system for detecting and quantifying blockiness in a video file. The video file consists of one or more image frames that are divided into one or more blocks. The system includes a decoder that is configured to segment the one or more frames into one or more blocks. The system also includes a comparator for comparing one or more parameters associated with the one or more blocks with one or more threshold values. Additionally, the system includes a processor. The processor is configured to determine one or more intensity gradients for the one or more blocks, to compute the blockiness index of the one or more blocks, and assign a level of blockiness to the one or more frames, based on the blockiness index.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

The embodiments of the invention will hereinafter be described in conjunction with the appended drawings, provided to illustrate and not to limit the invention, wherein like designations denote like elements, and in which:

FIG. 8 is a diagram that illustrates the tables used to calculate the blockiness value of a frame image, based on the blockiness values obtained for each block, in accordance with an embodiment of the present invention.

DETAILED DESCRIPTION OF THE INVENTION

Figure 1:
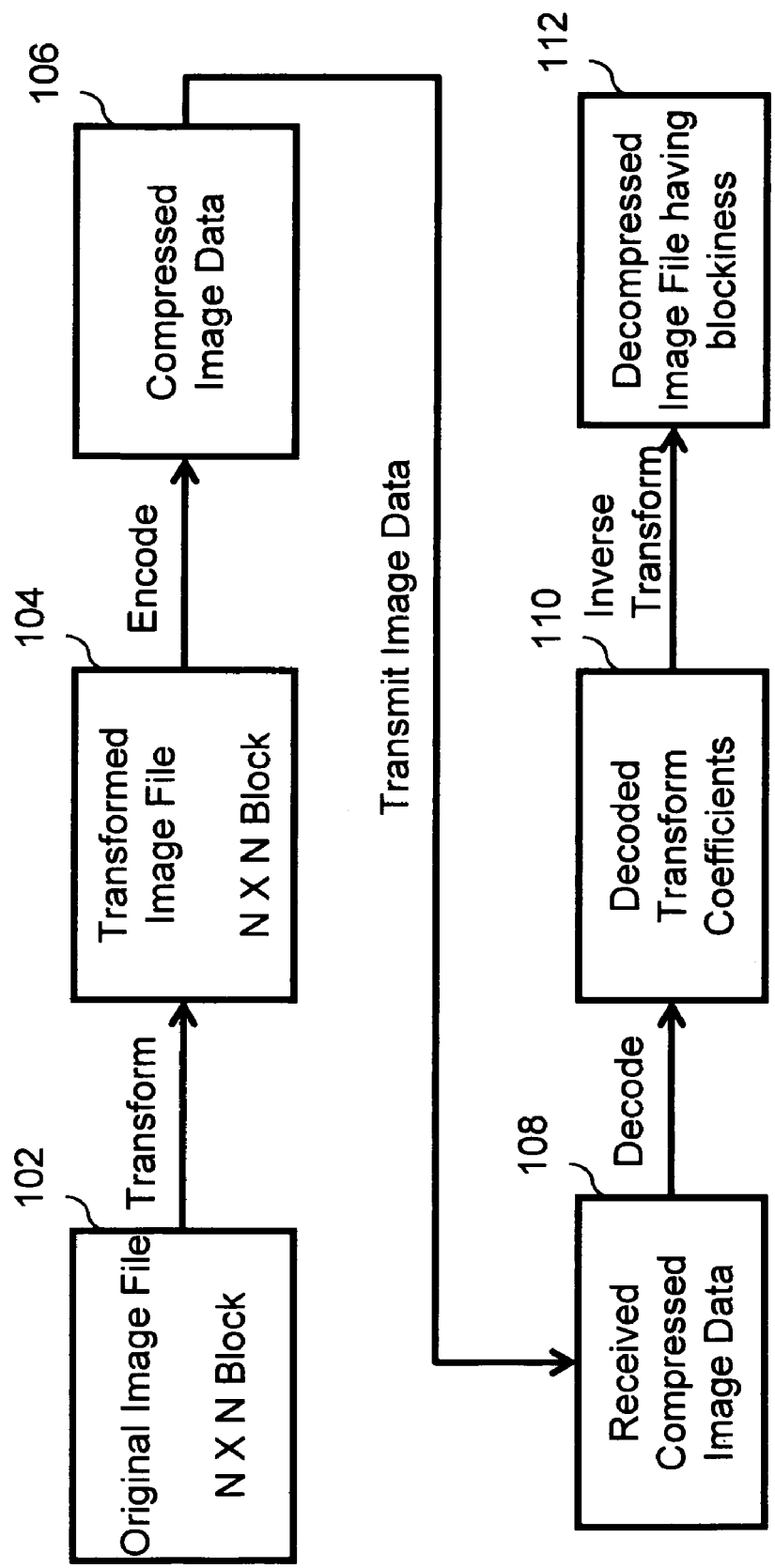
FIG. 1 is a functional block diagram illustrating the methodology known in the art for compressing, transmitting and reconstructing a digital image file.

Before describing in detail the particular method and system for detecting and quantifying blockiness in a video file, in accordance with various embodiments of the present invention, it should be observed that the present invention utilizes a combination of method steps and system components related to the method for detecting and quantifying blockiness in a video file. Accordingly, the system components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' 'including,' or any other variation thereof, are intended to cover a non-exclusive inclusion, such that a process, article, system or apparatus that comprises a list of elements does not include only those elements, but may include other elements not expressly listed or inherent to such a process, article or apparatus.

The term 'another', as used in this document, is defined as at least a second or more. The term 'includes', as used herein, is defined as comprising.

FIG. 1 is a functional block diagram illustrating the methodology known in the art for compressing, transmitting and reconstructing a digital image file. The block diagram 100 includes functional blocks that show an original image file 102, a transformed image file 104, and compressed image data 106 before transmitting the image data. At the receiving end of the transmitted image data, the block diagram 100 shows received compressed image data 108, decoded transform coefficients 110, and decompressed image file with blockiness 112. The transformed image file 104 is obtained from the original image file 102 by applying transformation algorithms to the original image file 102. Transformation algorithms are compression algorithms that are used to compress image files. A commonly used transform algorithm for compressing image files is the Discrete Cosine Transform (DCT). The DCT is a lossy algorithm, which has good data compaction properties. In the DCT algorithm, an image file is divided into N×N blocks of pixels. The DCT is then applied to the image and the results are quantized and entropy coded. Typically, the transform is applied to each block of 8×8 pixels. After the transformation is applied to the original image file 102, the transformed image file 104 is represented as a multi-dimensional array comprising 8×8 blocks of transform coefficients containing frequency component values that increase along the vertical and horizontal axis. The transformed image file 104 is then encoded to obtain the compressed image data 106. Encoding is performed to reduce the size of the data to be transmitted, but this encoding is lossy, and results in precision loss in the image file. Thereafter, the compressed image data 106 is transmitted and received at the receiving end, after which the compressed image data 108 is decoded to obtain 8×8 blocks of decoded transform coefficients 110. Inverse DCT is then applied to the transform coefficient array to obtain the reconstructed image file with blockiness 112.

Figure 2:
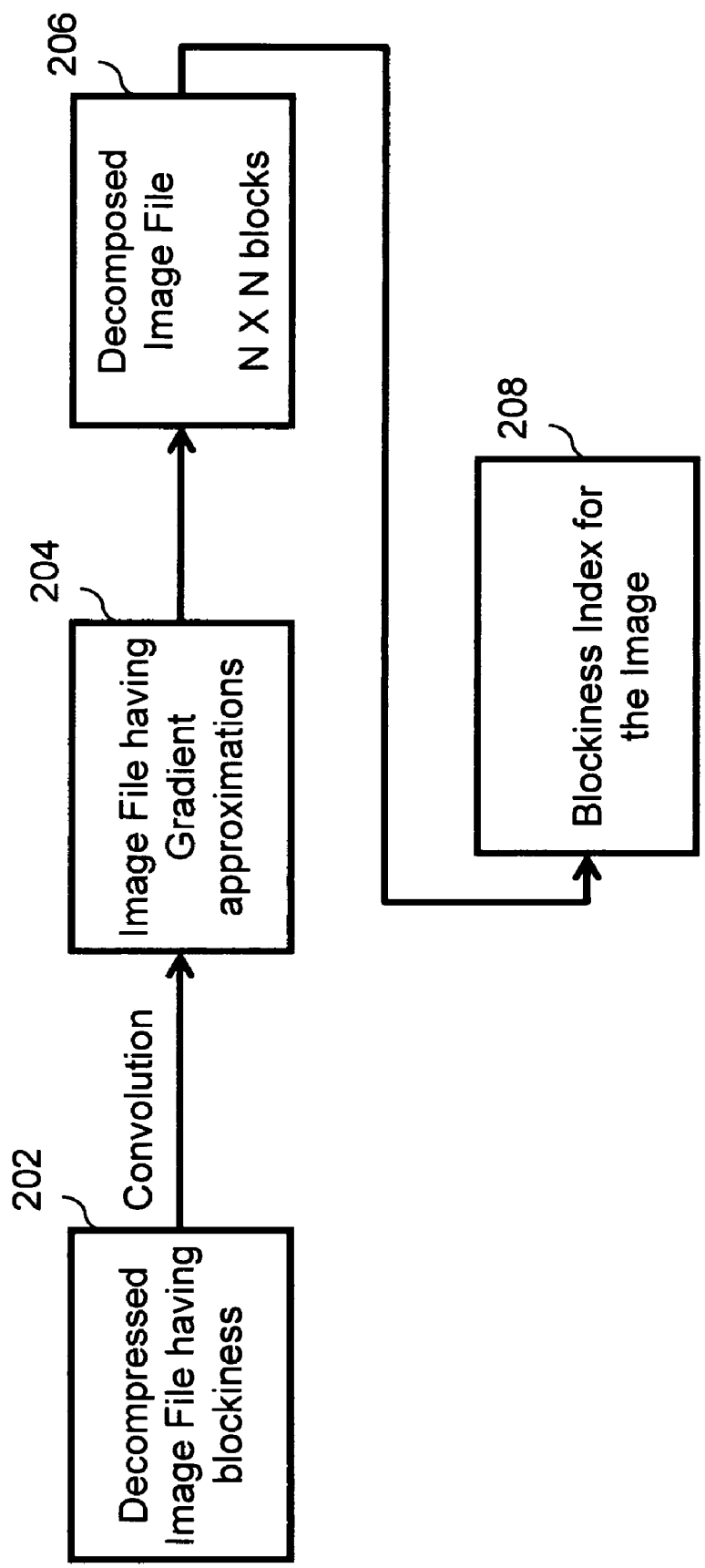
FIG. 2 is a functional block diagram illustrating a process for calculating the blockiness index of an image, as practiced in one of the prior art methods.

FIG. 2 is a functional block diagram illustrating a process for calculating the blockiness index of an image as practiced in one of the prior art methods. Blockiness being an artifact that is responsible for the degradation of an image file in block-transform coding and transmission, the detection of blockiness is an important part of checking received image/video files. As shown in FIG. 2, convolution is performed on the decompressed image file with blockiness 202. The image file 202 is convolved with two Sobel masks that are defined as follows:

$$M_x[3][3]=\{\{-1,0,1\},\{-2,0,2\},\{-1,0,1\}\};$$

$$M_y[3][3]=\{\{-1,-2,-1\},\{0,0,0\},\{1,2,1\}\}.$$

The convolution results in an image file having gradient approximations 204 for each pixel point in the image. The gradient approximations are approximations of gradients of image intensity at each pixel point in the image. The horizontal component of gradient is a derivative of the image intensity at a pixel point in the horizontal direction, and the vertical component of gradient is a derivative of the image intensity at a pixel point in the vertical direction.

The gradients for the image calculated as a multi-dimensional array of values are denoted as:

Array of gradient values in the horizontal direction
$$(D_x)=I*M_x \quad (1)$$

Array of gradient values in the vertical direction $(D_y)$
$$=I*M_y \quad (2)$$

where * is the convolution operator.

The intensity gradients $(D_x, D_y)$ are then decomposed into 8×8 non-overlapping blocks to obtain the decomposed image file 206. The sets $\Omega_{1V}$, $\Omega_{1H}$ and $\Omega_2$ are considered for each 8×8 block. $\Omega_{1V}$ denotes the pixels along the vertical boundaries of the block, $\Omega_{1H}$ the pixels along the horizontal boundaries of the block, and $\Omega_2$ the inner pixels of the block. Using the sets $\Omega_{1V}$, $\Omega_{1H}$ and $\Omega_2$, the blockiness index of the image 208 is calculated as follows:

The image intensity variation at the block boundary is calculated as:

$$s_1 = \frac{1}{N_1}\left\{\sum_{(i,j)\in\Omega_{1V}}\frac{|D_x(i,j)|}{\max(D_x)} + \sum_{(i,j)\in\Omega_{1H}}\frac{|D_y(i,j)|}{\max(D_y)}\right\} \quad (3)$$

The image intensity variation inside the block is calculated as:

$$s_2 = \frac{1}{N_2}\sum_{(i,j)\in\Omega_2}\frac{D(i,j)}{\max(D)} \quad (4)$$

where $D(i,j) = \sqrt{D_x(i,j)^2 + D_y(i,j)^2}$ (5)

and $D(i,j)$ signifies the gradient magnitude at each pixel point.

$N_1$, $N_2$ are two normalization factors ($N_1$, $N_2$ are the number of elements in the sums $s_1$ and $s_2$).

In the equations (3) and (4):

$\max(D_x)$=The maximum gradient value from the gradient values of the pixels of the vertical boundaries ($\Omega_{1V}$) of the block $\max(D_y)$=The maximum gradient value from the gradient values of the pixels of the horizontal boundaries ($\Omega_{1H}$) of the block $\max(D)$=The maximum gradient value from the gradient values of the inner pixels of ($\Omega_2$) of the block Once $s_1$ and $s_2$ are calculated, S, which is the blockiness index of the block, is calculated by using the following formula:

$$S = \left|\frac{s_1^\lambda - s_2^\lambda}{s_1^\lambda + s_2^\lambda}\right| \quad (6)$$

The exponent $\lambda$ is useful for controlling the slope of the index S, in order to adjust the proposed blockiness measure with human perception tests.

The exponent $\lambda$ in this method is determined experimentally to be 2. The range of S is [0,1] where zero corresponds to the absence of blockiness distortion while one corresponds to an image severely affected by blockiness.

Finally, the blockiness value of the image is calculated using the average of blockiness indexes of all the blocks.

Figure 3:
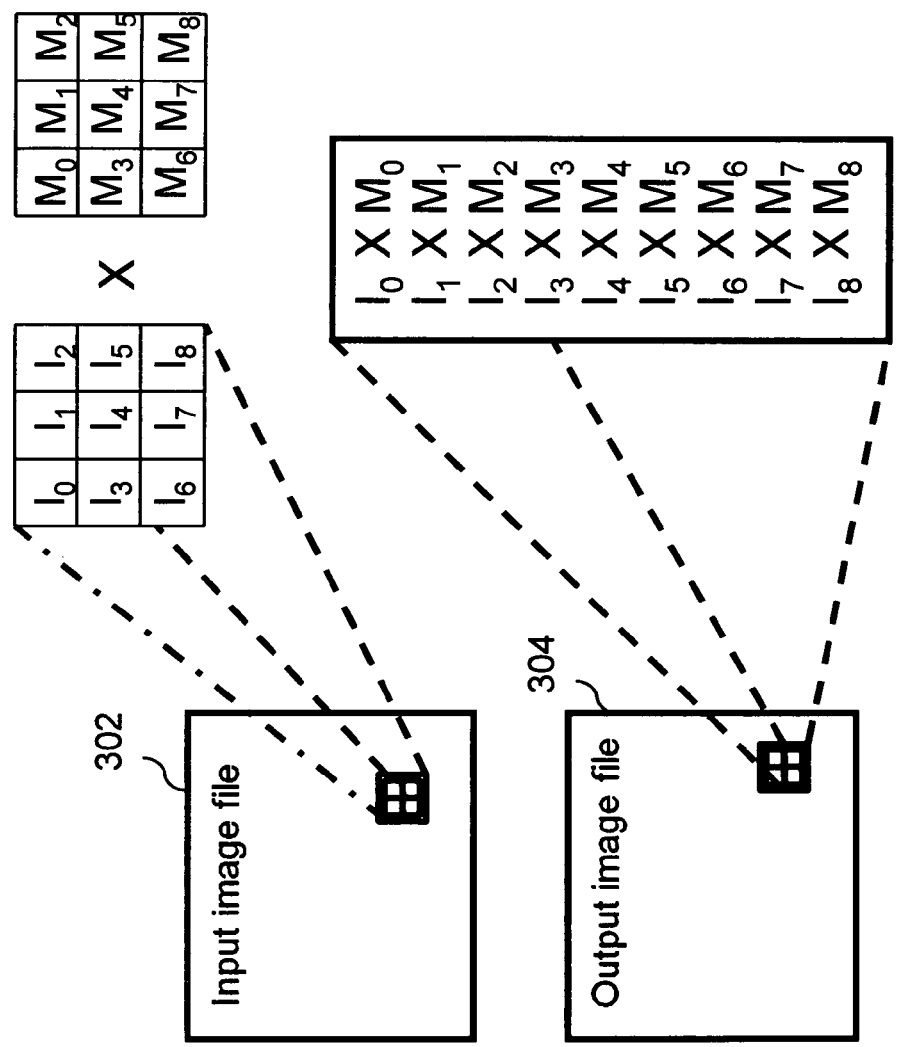
FIG. 3 is a diagram illustrating the convolution process used to calculate the blockiness index in the prior art method of FIG. 2.

FIG. 3 is a diagram illustrating the convolution process used in the calculation of blockiness index in the prior art method of FIG. 2. The input image file 302 is divided into multiple sets of 9 pixels each, where each set contains a pixel point and eight pixels in a 3×3 region around the pixel point. Each set of 9 pixels is represented by a (3×3) coefficient array containing pixel values of a pixel point and eight pixels around the pixel point. As shown in FIG. 3, $I_{3\times3}$ is such a coefficient array. The convolution process involves convolving the array $I_{3\times3}$ with a Sobel operator $M_{3\times3}$ to obtain an equivalent array $(I\times M)_{3\times3}$. The equivalent array $(I\times M)_{3\times3}$ is comprised of gradient values of image intensity for the set of 9 pixels represented by the array $I_{3\times3}$. Thus, the output image file 304 includes gradient approximation values of image intensity at each pixel point (in both the horizontal and vertical directions) in the image. In mathematical terms, gradient of image intensity at each pixel point is a vector pointing in the direction of largest possible intensity increase and having a length specifying the rate of change of intensity in that direction. However, for calculating an accurate gradient value, the image intensity function should be continuous in nature. In a digital image, the intensity function is known only at discrete pixel points and gradients of image intensity can be calculated by assuming an image intensity function for the digital image sampled at the pixel points. Hence, the gradient values obtained are approximations rather than accurate values.

Figure 4:
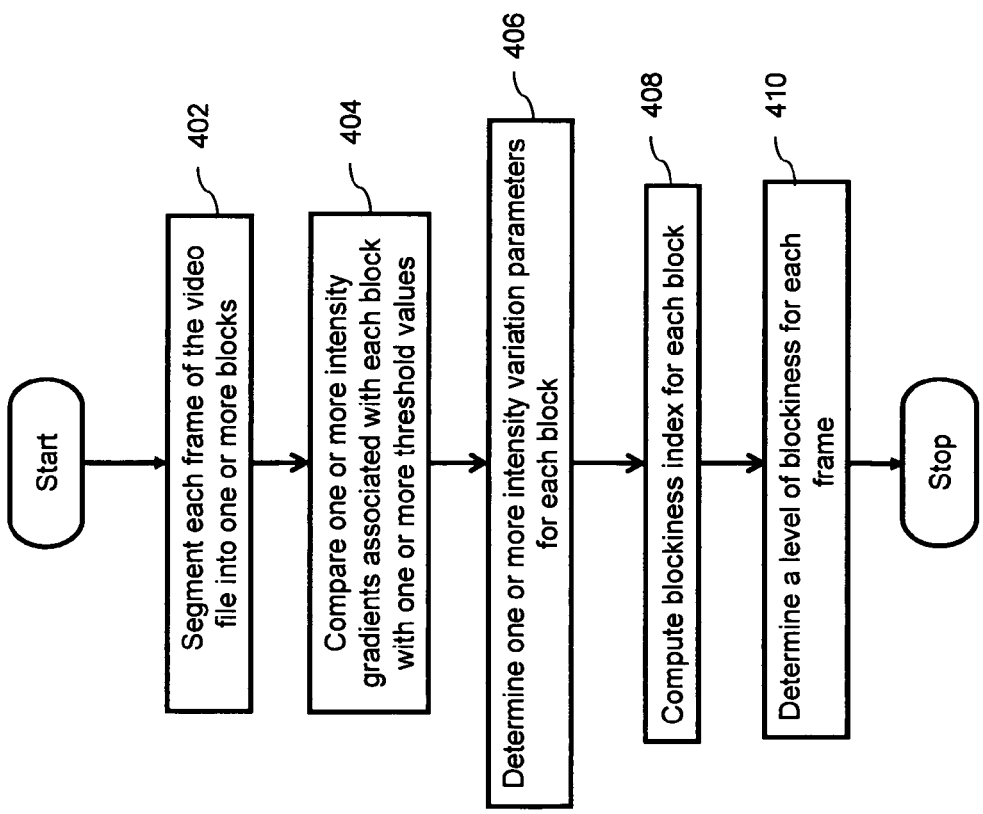
FIG. 4 is a flowchart illustrating a method for detecting and quantifying blockiness in a video file in accordance with an embodiment of the present invention.

FIG. 4 is a flowchart illustrating a method for detecting and quantifying blockiness in a video file, in accordance with an embodiment of the present invention. At step 402, each frame of the video file is segmented into one or more blocks. In an embodiment of the present invention, each frame is segmented into 8×8 blocks of sub-pixels. Thereafter, for each block, one or more gradients of the image intensity are calculated at each image point. The one or more intensity gradients are the approximations of image intensity calculated as described in the description of FIG. 2. In an embodiment, the one or more intensity gradients include an array of gradient values in the horizontal direction ($D_x$) and an array of gradient values in the vertical direction ($D_y$) for each pixel point in a block. At step 404, one or more intensity gradients associated with each block are compared with one or more threshold values. The one or more threshold values are pre-defined values that are compared with the one or more intensity gradients to distinguish true intensity variation from blockiness. In an embodiment, the one or more threshold values are a plain threshold value, a first edge threshold value and a second edge threshold value. The plain threshold value is an experimentally determined value that signifies plain behavior, i.e. low intensity variation. The first edge threshold value is an experimentally determined value that represents true edgy behavior, i.e. high intensity variation along the boundary pixels of the block. The second edge threshold value is an experimentally determined value that represents true edgy behavior, i.e. high intensity variation inside the block. In an example, at step 404, the maximum gradient value from the array of horizontal gradient values ($D_x$) of the vertical boundary pixels ($\Omega_{1V}$) of a block is compared with the first edge threshold value to determine true intensity variation along the vertical boundary pixels of the block. In this case, if the maximum gradient value is greater than the first edge threshold value, there is a true edge along the vertical boundary pixels of the block. Depending on the result of the comparisons at step 404, a set of conditions are established. These set of conditions are used for assigning one or more intensity variation parameters for each block at step 406 as described below. In an embodiment, the one or more intensity variation parameters are the image intensity variation at the block boundary ($s_1$) and the image intensity variation inside the block ($s_2$). At step 406, the one or more intensity variation parameters for each block are determined. $s_1$ is computed using equation (3) and $s_2$ is computed using equation (4). $s_1$ and $s_2$ are computed subject to the set of conditions established at step 404. This is done because the values of $s_1$ and $s_2$ are finally used in equation (6) for calculating the blockiness index (S) for a block at step 408. To get an accurate value of S, the set of conditions are used to assign values of $s_1$ and $s_2$ in equation (6), overriding the values calculated using equations (3) and (4). In an example, a zero value is assigned to $s_1$, if the intensity variation at the block boundary is found to be negligible, as a result of the maximum gradient value of the horizontal and vertical block boundary pixels ($\Omega_{1H}$ and $\Omega_{1V}$) being less than the plain threshold value. In another example, if the maximum gradient value from the array of horizontal gradient values ($D_x$) of the vertical boundary pixels of a block ($\Omega_{1V}$) is greater than the first edge threshold value, there is true intensity variation along the vertical block boundary pixels. Hence, $s_1$ is calculated from equation (3) using only the array of vertical gradient values ($D_y$). The blockiness index is a measure of blockiness in a block. The value of the blockiness index ranges from 0 to 1. Based on the blockiness index for each block in a frame, at step 410 a level of blockiness is determined for each frame. The level of blockiness for a frame is a comparative measure of blockiness with respect to blockiness in other frames of the video file.

Figure 5:
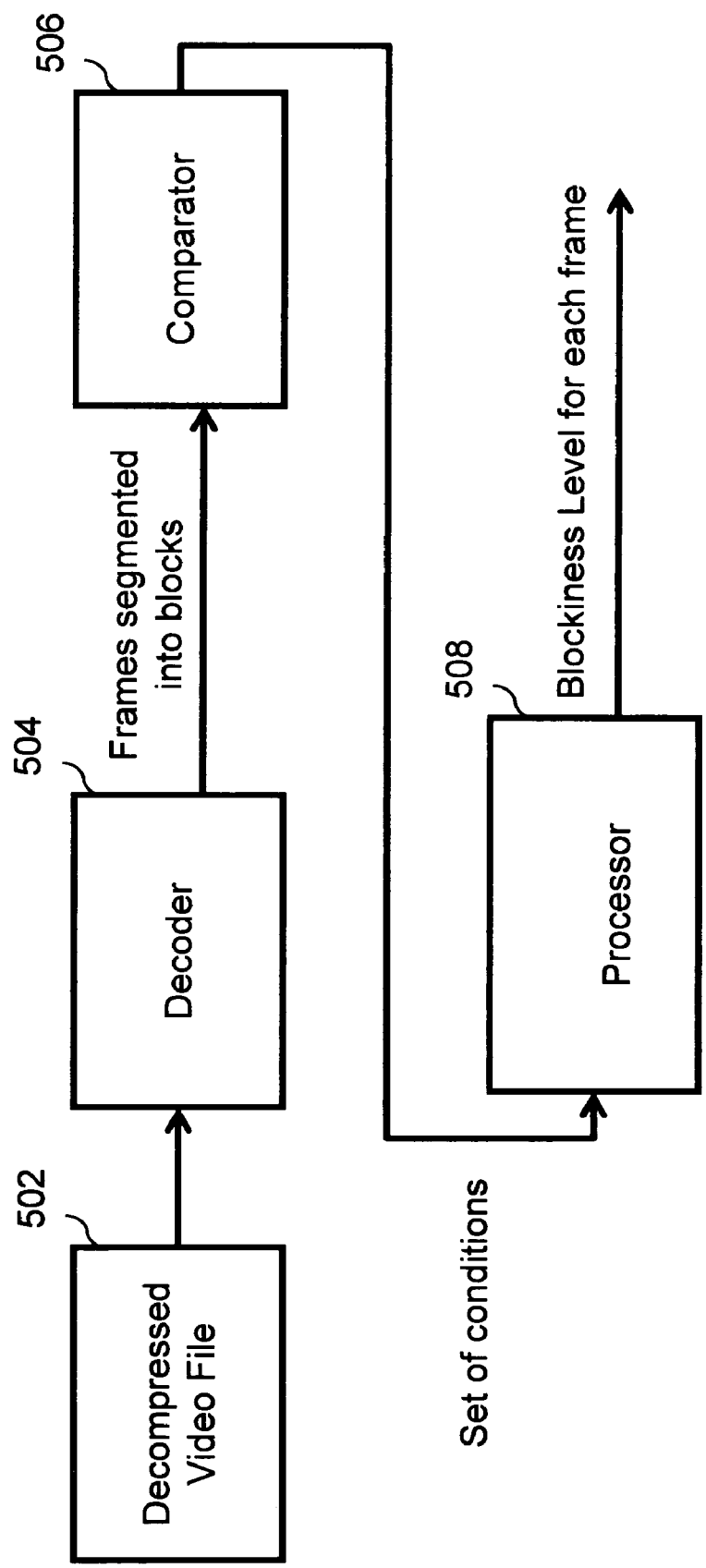
FIG. 5 is a block diagram illustrating the software modules used to detect and quantify blockiness in a video file in accordance with an embodiment of the present invention.

FIG. 5 is a block diagram illustrating the software modules used to detect and quantify the blockiness in a video file, in accordance with an embodiment of the present invention. The Block diagram shows a decompressed video file 502, a decoder 504, a comparator 506 and a processor 508. The decompressed video file 502 is the file at the receiver that has been obtained from a compressed image file received and decoded by using inverse transform algorithms. Each frame of the decompressed video file 502 is then segmented into one or more blocks by the decoder 504. The comparator 506 compares one or more intensity gradients associated with each of the one or more blocks with one or more threshold values. The one or more threshold values represent pre-defined intensity variation values. The output of the comparator is a set of conditions that is required to calculate the intensity variation parameters of a block. The processor 508 determines the intensity variation parameters of each of the one or more blocks, based on the set of conditions obtained by the comparison in the comparator 506. The processor 508 is also configured to calculate a blockiness index for each of the one or more blocks and assign a level of blockiness to each of one or more frames of the video file 502. In an embodiment, the processor 508 includes a selector for selecting blocks from the one or blocks having a blockiness index that is greater than a predefined blockiness value. Based on the number of blocks having blockiness index greater than the predefined blockiness value, the proportion of number of blocks having blockiness index greater than the predefined blockiness value is calculated. This proportion is known as the blockiness measure of a frame. In another embodiment, the software modules used to detect and quantify blockiness in a video file also include a memory unit for storing the one or more threshold values, the one or more intensity gradients, the one or more intensity variation parameters and the values of blockiness index for each of the one or more blocks of a frame.

Figure 6:
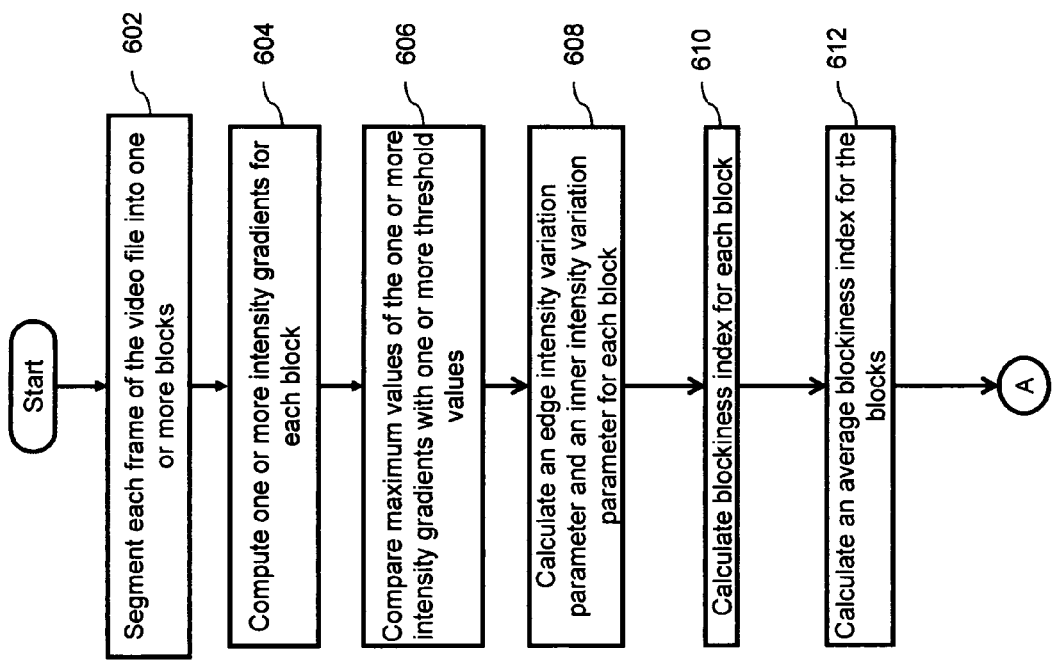
FIGS. 6 and 7 is a flowchart depicting a method for detecting and quantifying blockiness in a video file in accordance with another embodiment of the present invention.
Figure 7:
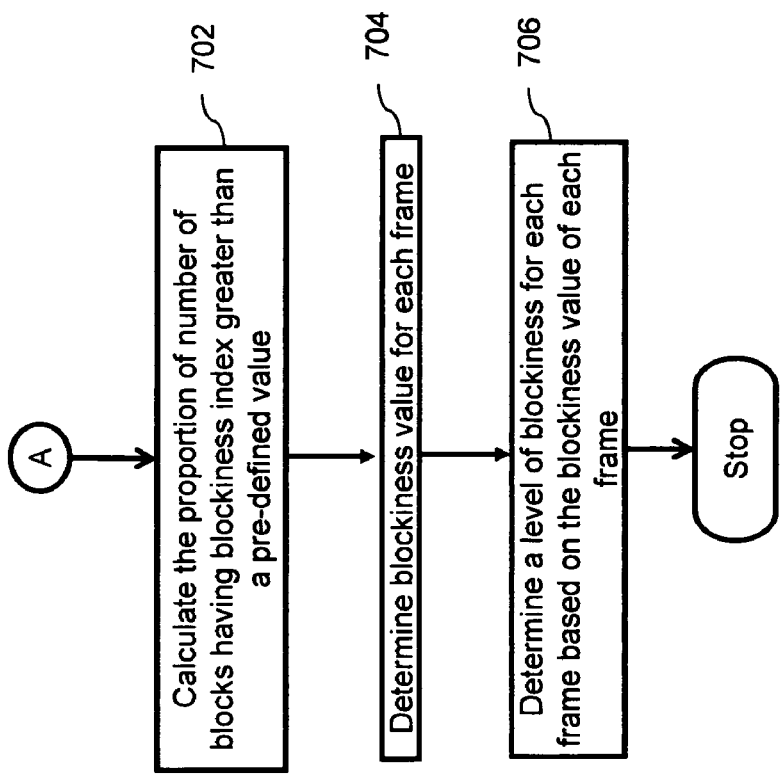

FIGS. 6 and 7 illustrate a flowchart depicting a method for detecting and quantifying blockiness in a video file, in accordance with another embodiment of the present invention. Blockiness is the presence of discontinuities (intensity variation) at block boundaries resulting due to DCT compression of digital images. At step 602, each frame of the video file is segmented into one or more blocks. In an embodiment, each block is composed of (8×8) pixels. The video file, in this case, is a file that has been compressed by a media content developer by using compression algorithms. The compression algorithms used are required to comply with compression standards such as JPEG, MPEG, H.264, etc. A commonly used algorithm for compression is the DCT algorithm, in which each frame of the video file is split into blocks of 8×8 pixels.

At step 604, one or more intensity gradients for each block of each frame are computed. These gradients are approximations of magnitude and direction of increase of image intensity at each pixel point. In one example, the gradient arrays $D_x$, $D_y$ and D for the pixels in a block are calculated, as described by the equations (1), (2) and (5). From the values in the arrays $D_x$, $D_y$ and D, maximum values of intensity gradients are calculated as follows:

A first gradient value, a second gradient value and a third gradient value are calculated for each 8×8 block. The sets $\Omega_{1V}$, $\Omega_{1H}$ and $\Omega_2$ are taken into consideration for calculating the first gradient value, the second gradient value and the third gradient value as described below. $\Omega_{1V}$ denotes the pixels of the vertical boundaries of the block, $\Omega_{1H}$ the pixels of the horizontal boundaries of the block, and $\Omega_2$ the inner pixels of the block.

First gradient value max($D_x$): The maximum gradient value from the gradient values of the pixels of the vertical boundaries ($\Omega_{1V}$) of the block.

Second gradient value max($D_y$): The maximum gradient value from the gradient values of the pixels of the horizontal boundaries ($\Omega_{1H}$) of the block.

Third gradient value max(D): The maximum gradient value from the gradient values of the inner pixels of ($\Omega_2$) of the block.

For accurate detection of blockiness for each 8×8 block, a clear distinction has to be made between intensity variations due to blockiness and true intensity variations (also known as true edges) inside the block and at the block boundary. Hence, at step 606, the maximum values of the one or more intensity gradients are compared with one or more threshold values. The one or more threshold values are pre-defined values that are compared with the first gradient value, the second gradient value and the third gradient value to distinguish true intensity variation from blockiness. In an embodiment, the one or more threshold values are a plain threshold value, a first edge threshold value and a second edge threshold value. The plain threshold value is an experimentally determined value that signifies plain behavior, i.e. low intensity variation. For example, if the maximum gradient value among the horizontal gradient values of the boundary pixels of a block is less than the plain threshold value, it means there is low intensity variation of the boundary pixels in the horizontal direction. The first edge threshold value is an experimentally determined value that represents true edgy behavior, i.e. high intensity variation along the boundary pixels of the block. For example, if the maximum gradient value among the horizontal gradient values of the vertical boundary pixels of a block is greater than the first edge threshold value, it means that there is a true edge along the vertical boundary pixels of the block. Similarly, the second edge threshold value is an experimentally determined value that represents true edgy behavior, i.e. high intensity variation inside the block. For example, if the maximum gradient value among the gradient magnitude values of the pixels inside a block is greater than the second edge threshold value, it means that there is a true edge inside the block. In an embodiment of the present invention, the maximum value of the plain threshold value, the first edge threshold value and the second edge threshold value are experimentally determined to be 6, 140 and 200, respectively. These threshold values have been determined based on experiments over a set of video streams.

In an embodiment, the first gradient value $max(D_x)$, the second gradient value $max(D_y)$ and the third gradient value $max(D)$ are compared with the plain threshold value, the first edge threshold value and the second edge threshold value as follows:

$max(D_x)$, $max(D_y)$ and $max(D)$ are individually compared with the plain threshold value.

$max(D_x)$ and $max(D_y)$ are individually compared with the first edge threshold value.

$max(D)$ is compared with the second edge threshold value.

Based on these comparisons a set of conditions are established for calculating an edge intensity variation parameter ($s_1$) and an inner intensity variation parameter ($s_2$). $s_1$ represents image intensity variation at the block boundary and $s_2$ represents image intensity variation inside the block. Thereafter, at step 610, the blockiness index (S) of each block is calculated from equation (6) by plugging in the values of $s_1$ and $s_2$ for the block, subject to the set of conditions established at step 608.

The blockiness index (S) for the block is calculated using equation (3), equation (4) and the set of conditions that are established based on the comparisons done at step 606. In an embodiment of the present invention, the edge intensity variation parameter ($s_1$) and the blockiness index (S) is calculated using equation (3) and equation (6) subject to the following four conditions:

Condition I. If the first gradient value $max(D_x)$ is less than the plain threshold value, the image intensity variation at the block boundary in the horizontal direction is negligible. Hence $s_1$ is calculated from equation (3) using only the second gradient value $max(D_y)$ and the gradient values in the vertical direction $D_y(i,j)$. Similarly, if the second gradient value is less than the plain threshold value, $s_1$ is calculated from equation (3) using the first gradient value $max(D_x)$ and the gradient values in the horizontal direction $D_x(i,j)$ Condition II. If both the first gradient value and the second gradient value are less than the plain threshold value, to calculate an accurate value of the blockiness index (S) for the block, $s_1$ is set to zero in equation (6). This is because if the intensity variation inside the block ($s_2$) is found to be zero from equation (4), then even a small value of $s_1$ will give an inaccurately high of value of S as per equation (6).

Condition III. If the first gradient value is higher than the first edge threshold value, the intensity variation along the vertical block boundary pixels is a true intensity variation in the image. Hence, $s_1$ is calculated from equation (3) using only the gradient values for the horizontal block boundary pixels i.e. second gradient value $max(D_y)$ and gradient values in the vertical direction $D_y(i,j)$. Similarly, if the second gradient value is higher than the first edge threshold value, $s_1$ is calculated from equation (3) using only the first gradient value $max(D_x)$ and gradient values in the horizontal direction $D_x(i,j)$ Condition IV. If both the first gradient value and the second gradient value are higher than the first edge threshold value, there should not be any blockiness at the boundary pixels of the block. Hence, $s_1$ for the block is set to zero in equation (6). Also, to calculate an accurate value of the blockiness index for the block, the blockiness index (S) for the block is set to zero. This is because since $s_1$ is zero, any value of $s_2$ will give an inaccurate blockiness value of 1 as per equation (6).

In another embodiment of the present invention, the inner intensity variation parameter ($s_2$) and the blockiness index (S) is calculated using equation (4) and equation (6), subject to the following condition: If the third gradient value is higher than the second edge threshold value, there is true intensity variation inside the block. Hence, to calculate an accurate value of blockiness, $s_2$ as well as the blockiness index (S) for the block is set to zero in equation (6).

In yet another embodiment of the present invention, if the values of $s_1$ and $s_2$ are zero, the value of blockiness index from equation (6) is indeterminate, though the accurate value should be zero. Hence, in this embodiment, the value of blockiness index (S) is set to zero.

At step 612, the average value of the blockiness index of all the blocks in a frame is calculated after calculating the blockiness indexes of all the blocks in a frame.

Thereafter, at step 702, the proportion of number of blocks with a blockiness index that is greater than a pre-defined blockiness value (blockiness measure) is calculated for each frame. In one example, Table 1, shown in FIG. 8, can be used to calculate the blockiness measure. In this example, the pre-defined blockiness value is taken as 0.4. Thus, the blockiness measure is calculated as:

$$(count\ 3 + count\ 4 + count\ 5 + count\ 6 + count\ 7)/total\ number\ of\ blocks \quad (7)$$

At step 704, the blockiness value of each frame is calculated by using the average value of the blockiness index and the blockiness measure of the frame. For example, an equation for calculating the blockiness value of each frame is experimentally determined to be $$Blockiness\ value = (Blockiness\ measure + 3 \times average\ value\ of\ blockiness\ index)/4 \quad (8)$$

The blockiness value calculated by using equation (8) is between 0 and 1.

At step 706, the blockiness value of each frame is used to assign a level of blockiness to each frame. In one example, the formula used to assign a blockiness level to a frame, based on the blockiness value, is as follows:

Blockiness level of frame=floor (((blockiness value of frame×100)+5.0)/10), where floor gives the nearest integer. For example, floor (31/10)=3. The ranges of the one or more levels of blockiness, corresponding to this equation, are listed in Table 2 that is shown in FIG. 8.

Various embodiments, as discussed above, provide a method and system for detecting and quantifying blockiness in video files. The method automatically segments image frames of a video file into blocks. Thereafter, the method computes the blockiness index of each block of an image frame, and determines a blockiness value for each frame. Then the method determines a level of blockiness for each frame of the video file. The blockiness level of a frame, which is a comparative measure of blockiness with respect to other frames, can have a value between 0 and 100. Zero value of a blockiness level indicates no blockiness in a frame. The higher the blockiness level, the higher is the blockiness content in the frame. The blockiness values provided by this method are more accurate, as compared to prior art methods. Additionally, this method ensures that the blockiness levels calculated are not indeterminate for corner cases. Examples of corner cases include cases where either the variation of image intensity inside the block or outside the block, or both, is low. Examples of corner cases also include cases where there is true intensity variation at the boundary edges of a block in a frame or inside the block.

The method and system for detecting and quantifying blockiness in video files, as described in the present invention, may be embodied in the form of a computer system. Typical examples of a computer system include a general-purpose computer, a programmed microprocessor, a microcontroller, a peripheral integrated circuit element, and other devices or arrangements of devices, which are capable of implementing the steps that constitute the method of the present invention.

The computer system comprises a computer, an input device, a display unit and the Internet. The computer comprises a microprocessor, which is connected to a communication bus. The computer also includes a memory, which may be a Random Access Memory (RAM) and Read Only Memory (ROM). The computer system also comprises a storage device, which can be a hard disk drive or a removable storage drive such as a floppy disk drive, an optical disk drive, and the like. The storage device can also be other similar means for loading computer programs or other instructions into the computer system.

The computer system executes a set of instructions that are stored in one or more storage elements to process input data. The storage elements may also hold data or other information, as desired. The storage element may be in the form of an information source or a physical memory element present in the processing machine. Exemplary storage elements include a hard disk, a DRAM, an SRAM and an EPROM. The storage element may be external to the computer system, and connected to or inserted into the computer, to be downloaded at or prior to the time it is used. Examples of such external computer program products are computer-readable storage mediums such as CD-ROMS, Flash chips, floppy disks, and the like.

The set of instructions may include various commands that instruct the processing machine to perform specific tasks, such as the steps that constitute the method of the present invention. The set of instructions may be in the form of a software program. The software may be in various forms such as system software or application software. Further, the software may be in the form of a collection of separate programs, a program module with a larger program, or a portion of a program module. The software may also include modular programming in the form of object-oriented programming. The software program with the set of instructions can be embedded in a computer program product, for use with a computer, with the computer program product comprising a computer-usable medium that has a computer-readable program code embodied therein. Processing of input data by the processing machine may be in response to users' commands to the results of previous processing, or in response to a request made by another processing machine.

The modules described herein may include processors and program instructions for implementing the functions of the modules described herein. Some or all the functions could be implemented by a state machine that has no stored program instructions, or in one or more application-specific integrated circuits (ASICs), in which each function or some combinations of certain of the functions are implemented as custom logic.

In the foregoing specification, the invention and its benefits and advantages have been described with reference to specific embodiments. However, one with ordinary skill in the art would appreciate that various modifications and changes can be made, without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A computer implemented method for detecting and quantifying blockiness in a video file, the video file comprising one or more frames, the method comprising:
    segmenting one or more of the frames into one or more blocks;
    comparing one or more intensity gradients associated with the one or more blocks with one or more threshold values, wherein the one or more threshold values signify pre-defined intensity variation values;
    based on the comparison, determining one or more intensity variation parameters for the one or more blocks;
    computing a blockiness index for the one or more blocks, wherein the blockiness index is calculated using the one or more intensity variation parameters of the corresponding one or more blocks; and
    determining a level of blockiness for the one or more frames based on the blockiness index of the corresponding one or more blocks.

2. The computer implemented method according to claim 1, wherein the step of determining the one or more intensity variation parameters comprises calculating at least one of an edge intensity variation parameter and an inner intensity variation parameter by comparing the one or more intensity gradients with the one or more threshold values.

3. The computer implemented method according to claim 2, wherein the one or more intensity gradients comprises a first gradient value, a second gradient value and a third gradient value.

4. The computer implemented method according to claim 3, wherein the edge intensity variation parameter is calculated by comparing the first gradient value and the second gradient value with a plain threshold value, wherein the plain threshold value signifies low intensity variation.

5. The computer implemented method according to claim 3, wherein the edge intensity variation parameter is calculated by comparing the first gradient value and the second gradient value with a first edge threshold value, wherein the first edge threshold value signifies high intensity variation.

6. The computer implemented method according to claim 3, wherein the inner intensity variation parameter is calculated by comparing the third gradient value with a plain threshold value, wherein the plain threshold value signifies low intensity variation.

7. The computer implemented method according to claim 3, wherein the inner intensity variation parameter is calculated by comparing the third gradient value with a second edge threshold value, wherein the second edge threshold value signifies high intensity variation.

8. The computer implemented method according to claim 1, wherein the step of determining the level of blockiness comprises
   calculating a blockiness value for the one or more frames; and
   determining the level of blockiness of the one or more frames based on the blockiness value for the one or more frames.

9. The computer implemented method according to claim 8, wherein calculating blockiness value for the one or more frames comprises:
   calculating an average value of blockiness index for the corresponding one or more blocks;
   calculating a blockiness measure for the one or more frames, wherein the blockiness measure is the proportion of number of blocks from the corresponding one or more blocks having blockiness index greater than a pre-defined blockiness value; and
   determining the blockiness value for the one or more frame based on the average value of blockiness index of the corresponding one or more blocks and the blockiness measure.

10. A system for detecting and quantifying blockiness in a video file, the video file comprising one or more frames, the system comprising:
    a decoder configured to segment one or more of the frames into one or more blocks;
    a comparator configured to compare one or more intensity gradients associated with the one or more blocks with one or more threshold values, wherein the one or more threshold values signify pre-defined intensity variation values; and
    a processor configured to:
       determine one or more intensity variation parameters for the one or more blocks based on the comparison of the one or more intensity gradients with the one or more threshold values;
       compute a blockiness index for the one or more blocks, wherein the blockiness index is based on the one or more intensity variation parameters of the corresponding one or more blocks; and
       assign a level of blockiness to the one or more frames based on the blockiness index of the corresponding one or more blocks.

11. The system according to claim 10, wherein the processor is further configured to:
    calculate a blockiness value for the one or more frames based on the blockiness index of the one or more blocks associated with the one or more frames; and
    determine a level of blockiness for the one or more frames based on the blockiness value of the one or more frames.

12. The system according to claim 11, wherein the processor further comprises a selector configured to select a set of blocks from the one or more blocks having blockiness index greater than a predefined blockiness value, further wherein the set of blocks is selected to calculate a blockiness measure for the frame corresponding to the one or more blocks.

13. The system according to claim 10 further comprising a memory unit configured to store at least one of the one or more threshold values, the one or more intensity gradients, the one or more intensity variation parameters and the values of blockiness index for the one or more blocks of the one or more frames.

14. A computer program product for use with a computer, the computer program product comprising a computer usable medium having a computer readable program code embodied therein for detecting and quantifying blockiness in a video file, the video file comprising one or more frames, the computer program code performing:
   segmenting one or more of the frames into one or more blocks;
   comparing one or more intensity gradients associated with the one or more blocks with one or more threshold values, wherein the one or more threshold values signify pre-defined intensity variation values;
   based on the comparison, determining one or more intensity variation parameters for the one or more blocks;
   computing a blockiness index for the one or more blocks, wherein the blockiness index is calculated using the one or more intensity variation parameters of the corresponding one or more blocks; and
   determining a level of blockiness to the one or more frames based on the blockiness index of the corresponding one or more blocks.

15. The computer program product of claim 14, wherein the computer program code performing the step of determining the one or more intensity variation parameters comprises a computer program code performing calculating at least one of an edge intensity variation parameter and an inner intensity variation parameter by comparing the one or more intensity gradients with the one or more threshold values.

16. The computer program product of claim 15, wherein the computer program code performing the step of calculating the edge intensity variation parameter comprises a computer program code performing comparing a first gradient value and a second gradient value with a plain threshold value, wherein the first gradient value and the second gradient value are intensity gradients associated with a block, further wherein the plain threshold value signifies low intensity variation.

17. The computer program product of claim 15, wherein the computer program code performing the step of calculating the edge intensity variation parameter comprises a computer program code performing comparing a first gradient value and a second gradient value with a first edge threshold value, wherein the first gradient value and the second gradient value are intensity gradients associated with a block, further wherein the first edge threshold value signifies high intensity variation.

18. The computer program product of claim 15, wherein the computer program code performing the step of calculating the inner intensity variation parameter comprises a computer program code performing comparing a third gradient value with a plain threshold value, wherein the third gradient value is a gradient associated with a block, further wherein the plain threshold value signifies low intensity variation.

19. The computer program product of claim 15, wherein the computer program code performing the step of calculating the inner intensity variation parameter comprises a computer program code performing comparing a third gradient value with a second edge threshold value, wherein the third gradient value is a gradient associated with a block, further wherein the second edge threshold value signifies high intensity variation.

20. The computer program product of claim 14, wherein the computer program code performing the step of determining the level of blockiness comprises a computer program code performing:

calculating a blockiness value for the one or more frames; and determining the level of blockiness of the one or more frames based on the blockiness value for the one or more frames.

* * * * *